United States Patent
Gavade et al.

(10) Patent No.: US 10,462,539 B2
(45) Date of Patent: Oct. 29, 2019

(54) MANAGING TRANSITIONS BETWEEN A LOCAL AREA NETWORK AND A WIDE AREA NETWORK DURING MEDIA CONTENT PLAYBACK

(71) Applicant: Verizon Patent and Licensing Inc., Arlington, VA (US)

(72) Inventors: Sameer Gavade, Irving, TX (US); Sanjay Ahuja, Irving, TX (US); Venkata S. Adimatyam, Irving, TX (US); Anil Kumar Padi, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 234 days.

(21) Appl. No.: 15/161,919

(22) Filed: May 23, 2016

(65) Prior Publication Data
US 2017/0339105 A1    Nov. 23, 2017

(51) Int. Cl.
*H04N 21/858*    (2011.01)
*H04L 29/08*    (2006.01)
(Continued)

(52) U.S. Cl.
CPC ......... *H04N 21/8586* (2013.01); *H04L 67/18* (2013.01); *H04N 21/64322* (2013.01);
(Continued)

(58) Field of Classification Search
CPC ............. H04L 65/4084; H04L 67/2814; H04L 65/1059; H04L 45/7453; H04L 45/566; H04L 67/28; H04L 29/12009; H04L 61/2596; H04L 45/22; H04L 49/3036; H04L 67/1097; H04L 61/1511; H04L 29/12066; H04L 61/2007; G06F 17/30902; G06F 12/0875; G06F 21/606; G06F 12/02; G06F 12/08; G06F 3/0604; G06F 3/0629; G06F 11/1453; G06F 13/1657; G06F 17/30156; G06F 3/065; G06F 13/128; G06F 17/30067; H04N 21/8586; H04N 21/2183;
(Continued)

(56) References Cited

U.S. PATENT DOCUMENTS 5,742,845 A * 4/1998 Wagner .................... G06F 8/33
                                                705/26.1
6,480,508 B1 * 11/2002 Mwikalo ........... H04L 29/12066
                                                370/475
(Continued)

*Primary Examiner* — Sargon N Nano

(57) ABSTRACT

A device may receive a request, associated with media content, that includes a first segment identifier of a first set of segment identifiers that identify a set of remote locations, external from a local area network, from which a first set of segments of the media content are accessible. The device may determine, based on the first segment identifier and redirect information, a second segment identifier of a second set of segment identifiers that identify a set of local locations, internal to the local area network, from which a second set of segments of media content are accessible. The second set of segments may correspond to the first set of segments. The redirect information may indicate that the second segment identifier corresponds to the first segment identifier. The device may request a segment of the media content using the second segment identifier.

20 Claims, 6 Drawing Sheets

(51) Int. Cl.
  *H04N 21/8352* (2011.01)
  *H04N 21/643* (2011.01)
  *H04N 21/845* (2011.01)
  H04N 21/482 (2011.01)
(52) U.S. Cl.
  CPC ..... *H04N 21/8352* (2013.01); *H04N 21/8456* (2013.01); *H04L 67/1002* (2013.01); *H04L 67/2814* (2013.01); *H04N 21/4825* (2013.01)
(58) Field of Classification Search
  CPC ........... H04N 21/4622; H04N 21/4627; H04N 21/64322
  See application file for complete search history.

(56) References Cited

U.S. PATENT DOCUMENTS

| | | | |
|---|---|---|---|
| 8,887,214 B1* | 11/2014 | Black | H04N 21/4227 725/90 |
| 2002/0026512 A1* | 2/2002 | Nishimura | G06F 17/30876 709/226 |
| 2003/0093669 A1* | 5/2003 | Morais | A63F 13/12 713/163 |
| 2007/0208737 A1* | 9/2007 | Li | H04L 67/26 |
| 2009/0113143 A1* | 4/2009 | Domsch | G06F 12/1009 711/154 |
| 2009/0132640 A1* | 5/2009 | Verma | G06F 17/30864 709/203 |
| 2011/0078327 A1* | 3/2011 | Li | H04L 29/12066 709/238 |
| 2011/0082982 A1* | 4/2011 | Harvell | G06F 17/30902 711/122 |
| 2013/0094445 A1* | 4/2013 | De Foy | H04L 45/021 370/328 |
| 2013/0173759 A1* | 7/2013 | Herse | G06F 21/34 709/219 |
| 2014/0245359 A1* | 8/2014 | De Foy | H04W 36/0011 725/62 |
| 2014/0351383 A1* | 11/2014 | Wan | H04L 65/605 709/219 |
| 2015/0222424 A1* | 8/2015 | Mosko | H04L 9/08 713/171 |

* cited by examiner

MANAGING TRANSITIONS BETWEEN A LOCAL AREA NETWORK AND A WIDE AREA NETWORK DURING MEDIA CONTENT PLAYBACK

BACKGROUND

In a content delivery network (CDN), media content may exist as multiple copies on strategically dispersed servers. The media content may include streaming audio, streaming video, Internet Protocol television (IPTV), or the like. To deliver the media content, the CDN may have thousands of servers located around the globe, making it possible for the media content provider to send the same media content to many requesting media clients efficiently and reliably. In many instances, the media client, which may be a mobile phone, a set-top box, or the like, may access media content from the CDN via a local area network (LAN), such as a Wi-Fi network, and/or a wide area network (WAN), such as a cellular network.

DETAILED DESCRIPTION OF PREFERRED EMBODIMENTS

The following detailed description of example implementations refers to the accompanying drawings. The same reference numbers in different drawings may identify the same or similar elements.

A media client (e.g., a mobile phone or a set-top box) may access media content, from a content delivery network (CDN), via a local area network (e.g., a Wi-Fi network) or a wide area network (e.g., a cellular network). When the media client accesses media content via a wide area network (WAN), the media client may obtain the media content from a content server of the CDN. To do this, the media client may use a remote segment identifier (e.g., a uniform resource locator (URL)) to access the media content stored on the content server. When the media client accesses media content via a local area network (LAN), the media client may obtain the media content via a LAN device, such as a media server or a LAN access point. To do this, the media client may use a local segment identifier to access the media content via the LAN device. The LAN device, in turn, may obtain the media content from the CDN.

When the media client transitions from one network to another, such as from the WAN to the LAN or from the LAN to the WAN, the media client may use the wrong type of segment identifier to attempt to access the media content. For example, the media client may use a local segment identifier to attempt to access the media content via the WAN. This may cause errors in playback because of an inability to access a LAN device, of the LAN, via the WAN.

Implementations described herein permit a media client to utilize a remote segment identifier regardless of whether the media client is connected to a LAN or a WAN. If the media client is connected to a WAN, the media client may obtain the media content from the CDN using the remote segment identifier. If the media client is connected to a LAN, a LAN device may convert the remote segment identifier to a local segment identifier, and the media client may obtain the media content locally (e.g., from the LAN device).

In this way, the quality of service and playback of the media content on the media client may be improved, particularly when the media client transitions between networks. Also, the media client may conserve computing resources by reducing the processing associated with determining whether to use a remote segment identifier or a local segment identifier. Also, network resources may be conserved by reducing or eliminating requests for media content that use an incorrect segment identifier, such as a remote segment identifier on the LAN or a local segment identifier on the WAN.

Figure 1A:
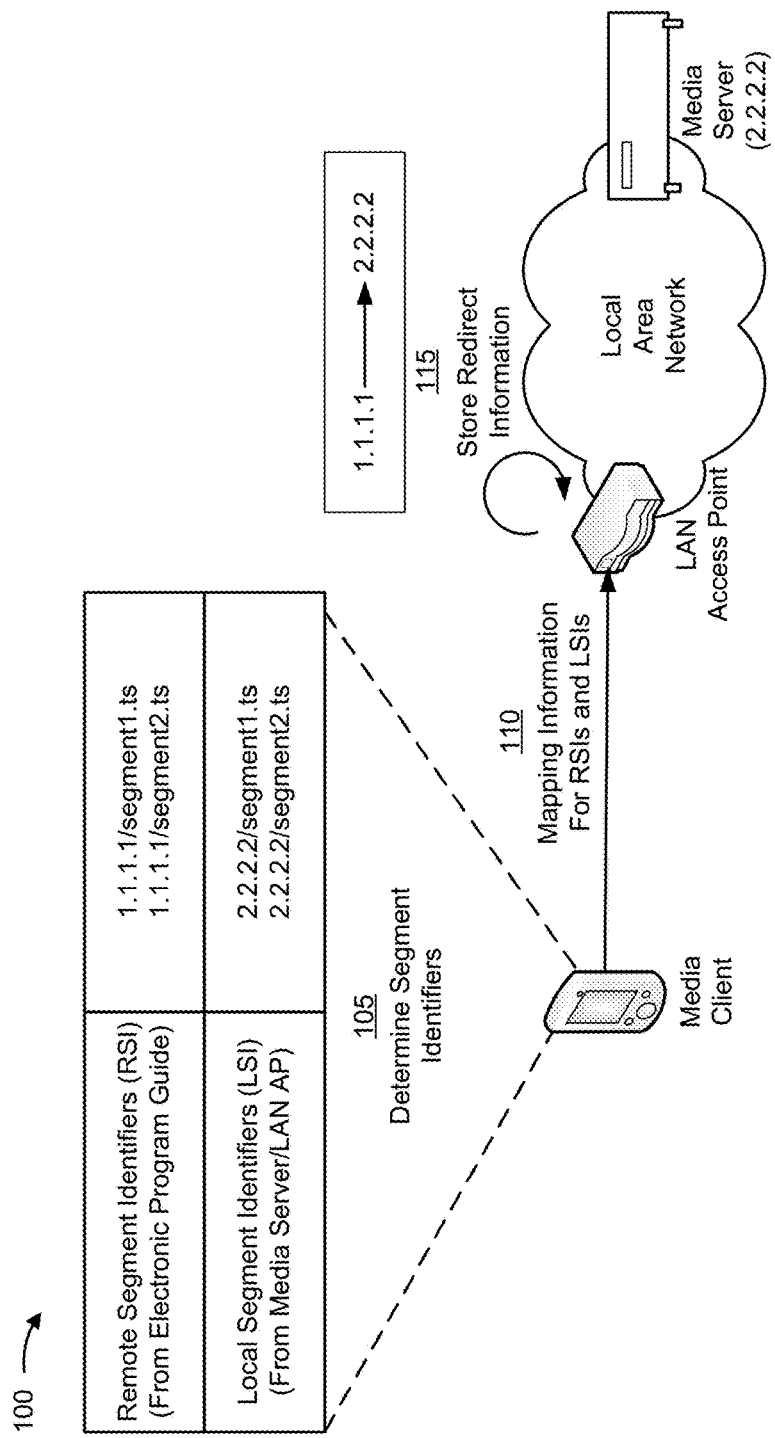
FIGS. 1A-1C are diagrams of an overview of an example implementation described herein.
Figure 1B:
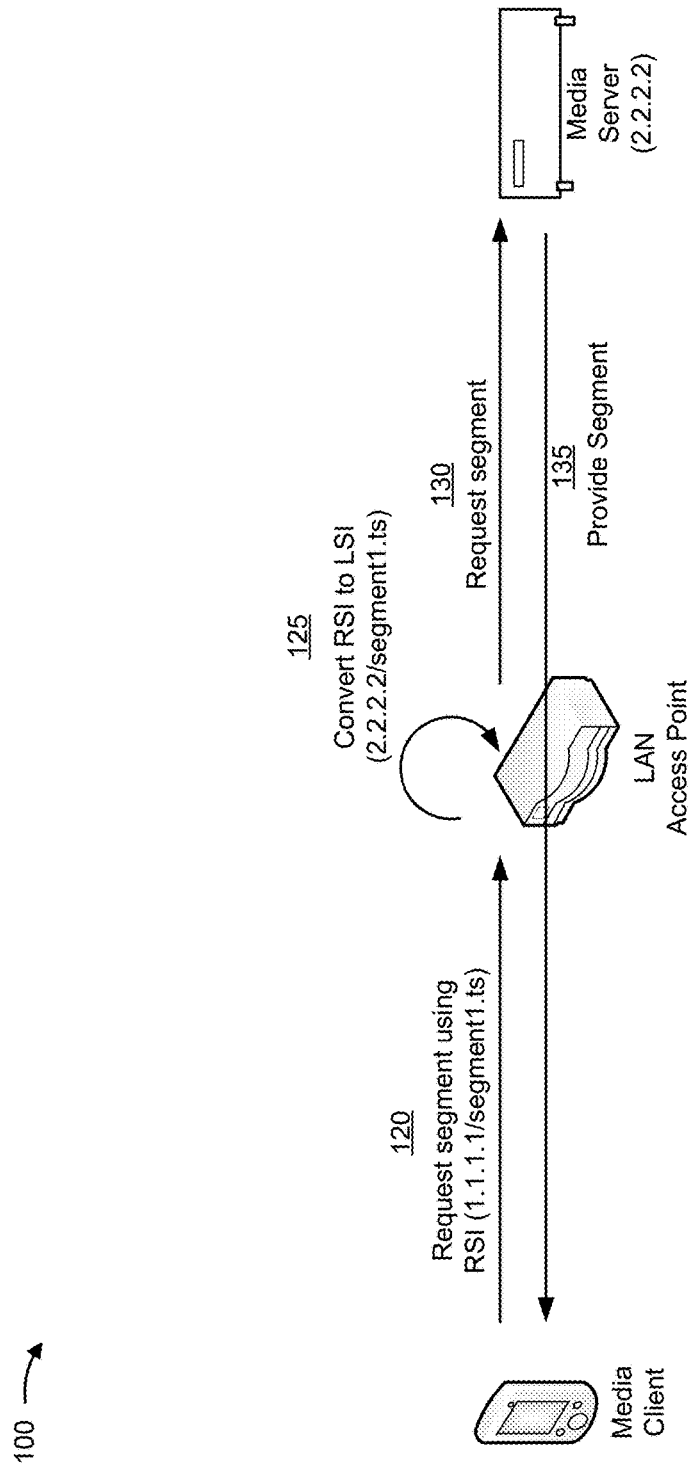
Figure 1C:
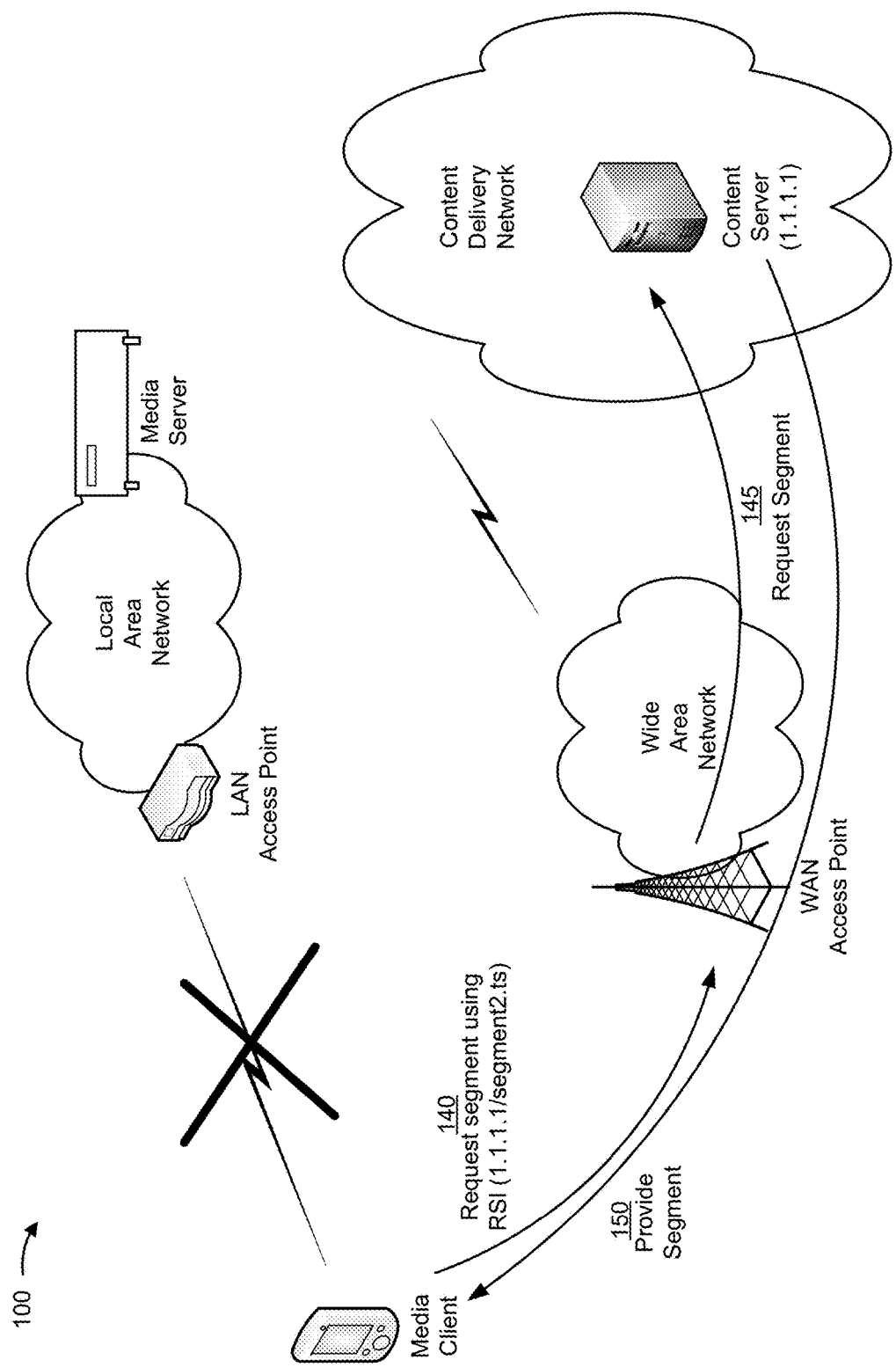

FIGS. 1A-1C are diagrams of an overview of an example implementation 100 described herein. As shown in FIG. 1A, and by reference number 105, a media client may determine segment identifiers for media content. For example, the media client may determine a set of remote segment identifiers, for accessing media content stored on a server of a CDN, based on information included in an electronic program guide. As further shown, the media client may determine a set of local segment identifiers, for accessing media content stored on a LAN device, based on information received from the LAN device (e.g., a LAN access point and/or a media server). In example implementation 100, assume that the server of the CDN has an IP address of 1.1.1.1, and a media server of the LAN has an IP address of 2.2.2.2, as shown.

As shown by reference number 110, the LAN access point may receive, from the media client, mapping information for the remote segment identifiers and the local segment identifiers. For example, the LAN access point may receive first mapping information associated with the set of remote segment identifiers, and second mapping information associated with a set of local segment identifiers. The LAN access point may use the mapping information to map remote segment identifiers to corresponding local segment identifiers.

As shown by reference number 115, the LAN access point may store redirect information that associates the first mapping information and the second mapping information. The redirect information may be used to permit the media client to request media content using a remote segment identifier despite the media content being stored locally by a LAN device (e.g., the LAN access point or a media server). In some implementation, the LAN access point may map a remote internet protocol (IP) address to a local internet protocol (IP) address, as shown. However, other mappings are possible, as described in more detail below.

As shown in FIG. 1B, and by reference number 120, the LAN access point may receive a request, associated with the media content, that includes a remote segment identifier (e.g., shown as 1.1.1.1/segment1.ts). As shown by reference number 125, The LAN access point may determine a local segment identifier (e.g., shown as 2.2.2.2/segment1.ts), which maps to the remote segment identifier, based on the redirect information stored by the LAN access point. As shown by reference number 130, the LAN access point may request the segment of media content, from the media server on the LAN, using the local segment identifier. As shown by reference number 135, the media server may provide the requested segment of media content to the media client via the LAN access point.

As shown in FIG. 1C, assume that the media client is disconnected from the LAN access point, the LAN, and/or the media server, and is connected to a WAN via a WAN access point. As shown by reference number 140, the media client continues to use remote segment identifiers to access the media content. This time, however, there is no conversion from the remote segment identifier to the local segment identifier. As shown by reference number 145, the request for the segment of media content sent to a contest server of the CDN via the WAN. As shown by reference number 150, the content server of the CDN returns the segment of requested media content to the media client via the WAN and/or the WAN access point.

In this way, the media client may request media content using a remote segment identifier regardless of whether the media client is connected to the LAN or the WAN. When the media client is connected to the LAN, the media client may use remote segment identifiers to request media content, and the LAN access point may convert the remote segment identifiers to local segment identifiers so that the media client can obtain the media content via the LAN. When the media client transitions to or is connected to the WAN (e.g., is disconnected from the LAN), the media client may also use the remote segment identifiers to access the media content via the WAN.

Because the media client does not have to switch back and forth between using remote segment identifiers and local segment identifiers, the quality of service associated with playback of media content on the media client may be improved. Additionally, by not switching between different types of segment identifiers, the media client may conserve computing resources. Also, by not switching between different types of segment identifiers, the media client may conserve network resources by reducing requests for local segment identifiers when the media client is connected to the WAN. Moreover, because switching between different types of segment identifiers may result in errors and/or requests for irretrievable content, errors and/or requests for irretrievable content may be reduced.

As indicated above, FIGS. 1A-1C are provided merely as an example. Other examples are possible and may differ from what was described with regard to FIGS. 1A-1C.

Figure 2:
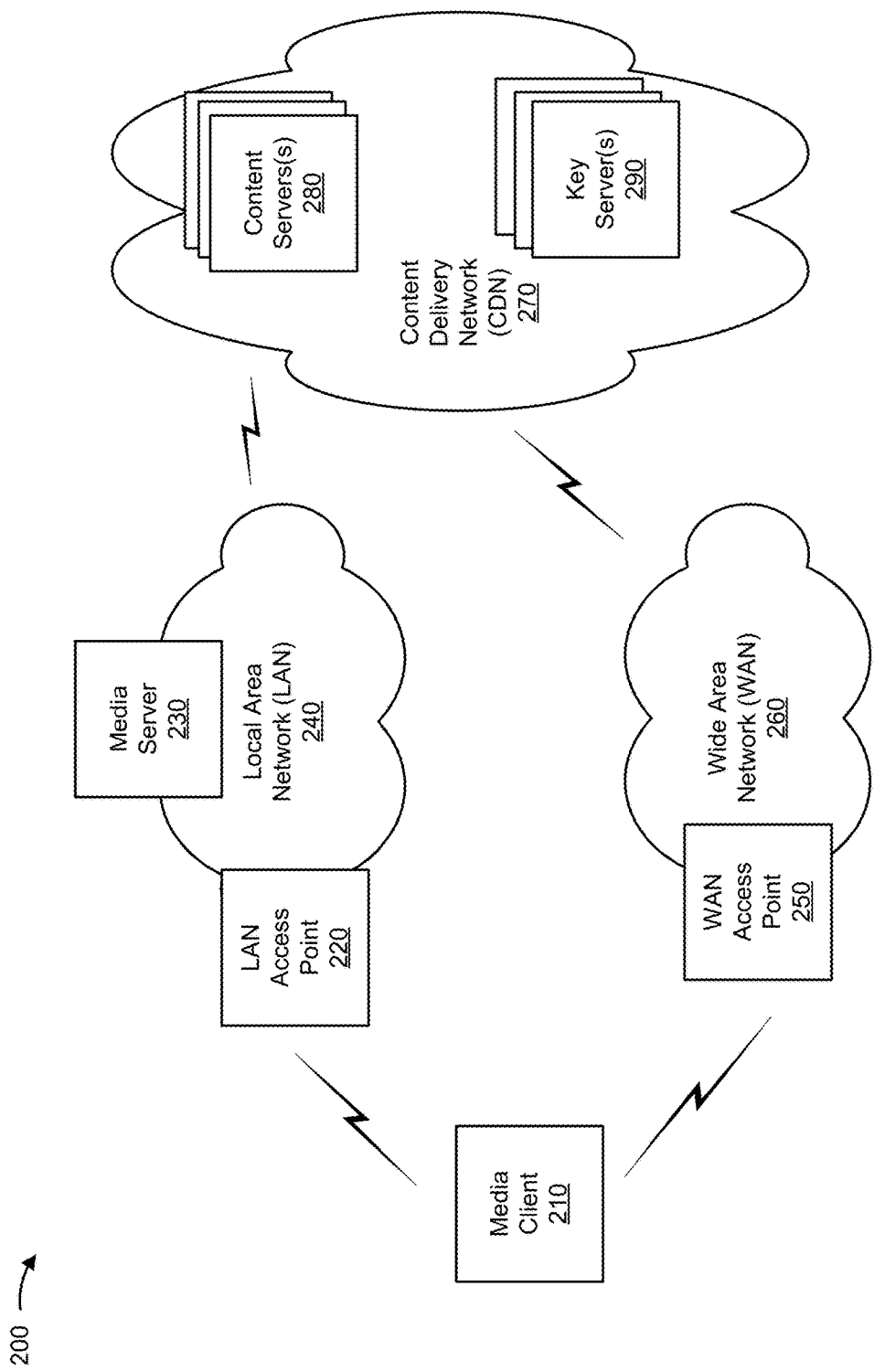
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a media client 210, a local area network (LAN) access point 220, a media server 230, a LAN 240, a wide area network (WAN) access point 250, a WAN 260, a content delivery network (CDN) 270, a set of content servers 280, and a set of key servers 290. Devices of environment 200 may interconnect via wired connections, wireless connections, or a combination of wired and wireless connections.

Media client 210 includes one or more devices capable of receiving, storing, processing, and/or providing media content. For example, media client 210 may include a set-top box, a casting stick (e.g., a high-definition media interface (HDMI) dongle), a smart phone, a tablet computer, a laptop computer, a desktop computer, a television, a cable card, a gaming device, a portable electronic device, or a similar type of device. In some implementations, media client 210 may request and receive media content from media server 230, LAN access point 220, and/or content server 280.

LAN access point 220 includes one or more devices capable of communicating with devices of LAN 240, such as media client 210 and/or media server 230, and providing network connectivity for those devices (e.g., via LAN 240). For example, LAN access point 220 may include a router, a gateway, a wireless local area network (WLAN) access point, a modem, a switch, a hub, a bridge, or a similar type of device. LAN access point 220 may enable media client 210 and media server 230 to communicate with one another and/or one or more other networks, such as CDN 270. In some implementations, LAN access point 220 may store media content locally, such as in an Internet Protocol television (IPTV) implementation. Additionally, or alternatively, LAN access point may provide connectivity, for media client 210, to media content stored by media server 230, such as in a virtual media server (VMS) implementation.

Media server 230 includes one or more devices capable of receiving, storing, processing, and/or providing media content. For example, media server 230 may include a set-top box, a DVR, a computer, or a similar type of device. Media server 230 may request and/or receive media content (e.g., from CDN 270), and may output the media content. In some implementations, media server 230 may output the media content to a display device (e.g., a television, a screen, etc.), an audio device (e.g., a speaker, etc.), or the like. Additionally, or alternatively, media server 230 may provide the media content to media client 210 (e.g., directly or via LAN access point 220), which may output the media content to a display device, an audio device, or the like. In some implementations, media server 230 may store media content locally, such as in a virtual media server (VMS) implementation.

LAN 240 includes one or more wired and/or wireless networks. For example, LAN 240 may include a LAN and/or a WLAN (e.g., a Wi-Fi network), a private network, an ad hoc network, an intranet, and/or a combination of these or other types of networks. In some implementations, media client 210 may access LAN 240 via LAN access point 220, and may communicate with media server 230 via LAN 240. For example, media client 210 may obtain media content from LAN access point 220 and/or media server 230 via LAN 240.

WAN access point 250 includes one or more devices capable of communicating with devices of WAN 260, such as media client 210, and providing network connectivity for those devices (e.g., via WAN 260). For example, WAN access point 250 may include a base station or a similar type of device. WAN access point 250 may enable media client 210 to communicate with one or more other networks, such as CDN 270 (e.g., via a core network). In some implementations, WAN access point 250 may communicate with media client 210 via an air interface.

WAN 260 includes one or more wired and/or wireless networks. For example, WAN 260 may include a cellular network (e.g., a long term evolution (LTE) network, a third generation (3G) network, or a code division multiple access (CDMA) network), a public land mobile network (PLMN), a metropolitan area network (MAN), a telephone network (e.g., a Public Switched Telephone Network (PSTN)), a private network, an ad hoc network, an intranet, the Internet, a fiber optic-based network, a cloud computing network, and/or a combination of these or other types of networks. In some implementations, media client 210 may access WAN 260 via WAN access point 250, and may communicate with content server(s) 280 and/or key server(s) 290 via WAN 260

(and CDN 270). For example, media client 210 may obtain media content from content server(s) 280 via WAN 260.

CDN 270 may include one or more wired and/or wireless networks. In some implementations, CDN 270 may include a distributed system of server devices (e.g., in one or more data centers) to receive media content (e.g., from a content provider) and to provide the media content for distribution. For example, CDN 270 may include a WAN, a MAN, a cellular network, a PLMN, a LAN, a telephone network (e.g., the Public Switched Telephone Network (PSTN)), a private network, an ad hoc network, an intranet, the Internet, a fiber optic-based network, a television network, a cloud computing network, or the like, and/or a combination of these or other types of networks.

Content server 280 includes one or more devices, such as one or more server devices, capable of receiving, generating, storing, processing, and/or providing media content. For example, content server 280 may include a server device separate from (e.g., remote from) media client 210, LAN access point 220, and media server 230. Content server 280 may record and/or store media content, and may provide the stored media content to media client 210 (e.g., upon request).

Key server 290 includes one or more devices, such as one or more server devices, capable of generating, storing, processing, deleting, and/or providing a key (e.g., a security key) to be used to authenticate one or more devices and/or to encrypt media content.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
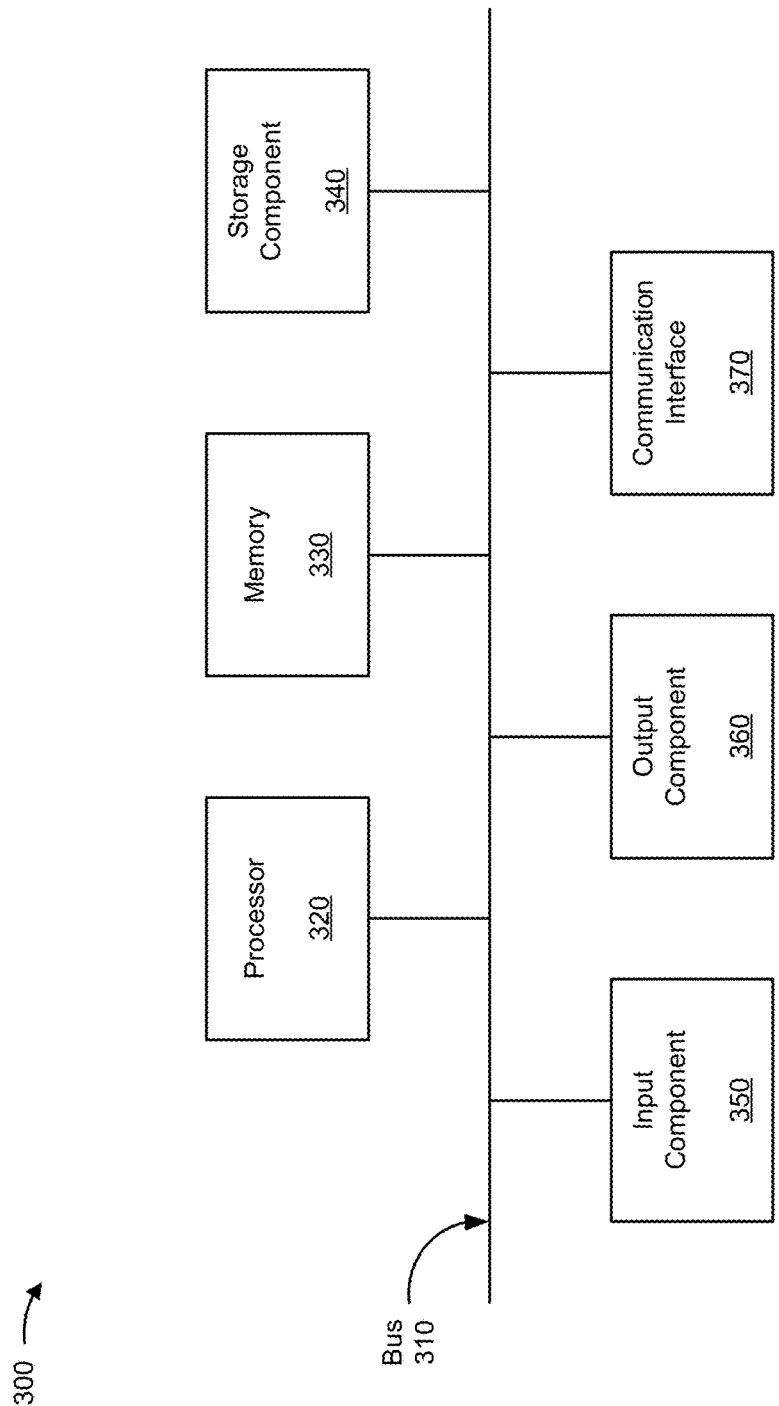
FIG. 3 is a diagram of example components of one or more devices of FIG. 2.

FIG. 3 is a diagram of example components of a device 300. Device 300 may correspond to media client 210, LAN access point 220, media server 230, WAN access point 250, content server 280, and/or key server 290. In some implementations, media client 210, LAN access point 220, media server 230, WAN access point 250, content server 280, and/or key server 290 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
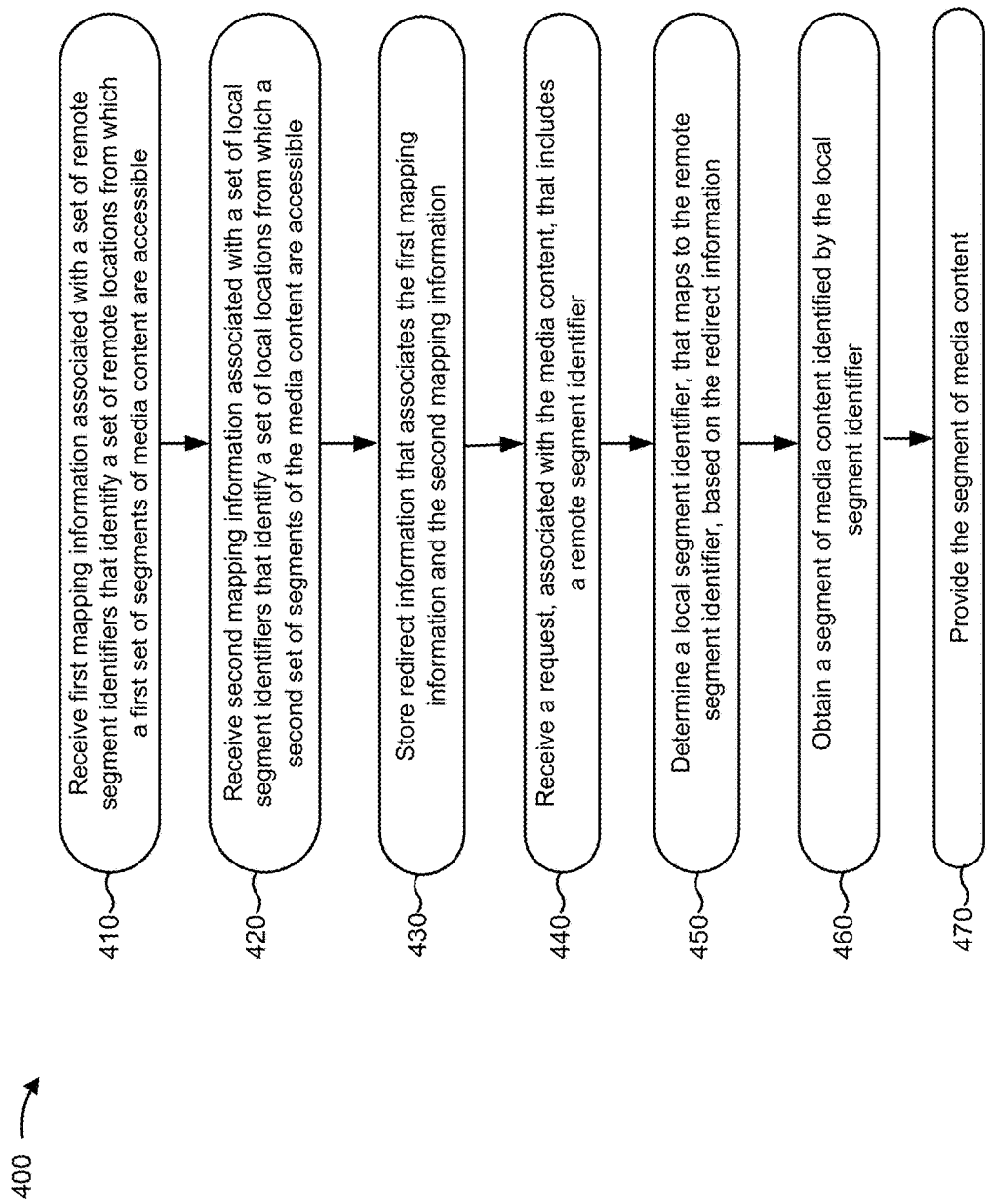
FIG. 4 is a flow chart of an example process for managing transitions between a local area network and a wide area network during media content playback.

FIG. 4 is a flow chart of an example process 400 for managing transitions between a local area network and a wide area network during media content playback. In some implementations, one or more process blocks of FIG. 4 may be performed by LAN access point 220. In some implementations, one or more process blocks of FIG. 4 may be performed by another device or a group of devices separate from or including LAN access point 220, such as media client 210, media server 230, WAN access point 250, content server 280, and/or key server 290.

As shown in FIG. 4, process 400 may include receiving first mapping information associated with a set of remote segment identifiers that identify a set of remote locations from which a first set of segments of media content are accessible (block 410). For example, LAN access point 220 may receive the first mapping information, associated with the set of remote segment identifiers, from media client 210. Additionally, or alternatively, media client 210 may store and/or obtain the set of remote segment identifiers in association with an electronic program guide. For example, media client 210 may store remote segment identifiers in association with an electronic program guide that indicates playlists of remote segment identifiers associated with the media content. The media content may include audio content and/or video content, such as television content, radio content, web content, streaming content, or the like. The television content may be provided via a live or prerecorded television broadcast. In some implementations, the electronic program guide may include different channels. In such a case, the different channels of the electronic program guide may be associated with different playlists.

In some implementations, a segment of media content may have a particular length. The length of a segment of media content may be shorter than the entirety of the media content. For example, in a case in which the media content is part of a television broadcast, a segment may be, for example, a subset of the television broadcast. In such a case, the segment of media content may be a ten (10) second segment, a thirty (30) second segment, a one (1) minute segment, or the like.

In some implementations, the segment of media content may have a particular size (e.g., a particular file size), a particular bitrate, a particular quantity of frames, a particular quality level (e.g., high definition or standard definition), or the like. Different segments may have the same or different lengths, sizes, bitrates, quantity of frames, quality level, or the like. Additionally, or alternatively, the segment of media content may be in a particular format, such the Moving Picture Experts Group (MPEG) Transport Stream file format, a Dynamic Adaptive Streaming over Hypertext Transfer Protocol (DASH) file format, or the like.

Additionally, or alternatively, LAN access point 220 may receive the remote segment identifiers from content server 280 (e.g., in association with an electronic program guide). A remote segment identifier may identify a segment of media content stored remotely from LAN 240. For example, a remote segment identifier may point to a memory location of content server 280 (and not a memory location of LAN access point 220 and/or media server 230).

The first mapping information may be used to map the set of remote segment identifiers to corresponding local segment identifiers, as described in more detail elsewhere herein. For example, the first mapping information may include an entire segment identifier, such as a uniform resource identifier (URI). Example uniform resource identifiers may include a uniform resource locator (URL), a uniform resource name (URN), or the like. As another example, the first mapping information may include a portion of a segment identifier. A portion of the segment identifier may include a network address included in the segment identifier, such as an Internet protocol (IP) address.

As another example, a portion of the segment identifier may include a portion of a uniform resource identifier (URI) (e.g., a uniform resource identifier portion), such as a host name, a path name, a file name, or the like.

Additionally, or alternatively, the first mapping information may be used to map a remote key, associated with a remote segment identifier, to a local key associated with a local segment identifier, as described in more detail below. A remote key may be stored remotely from LAN 240 (e.g., by key server 290 of CDN 270), and a local key may be stored locally to LAN 240 (e.g., by LAN access point 220 and/or media server 230).

As further shown in FIG. 4, process 400 may include receiving second mapping information associated with a set of local segment identifiers that identify a set of local locations from which a second set of segments of the media content are accessible (block 420). For example, LAN access point 220 may receive the second mapping information from media client 210, which may store and/or obtain the local segment identifiers. Additionally, or alternatively, media client 210 may obtain the set of local segment identifiers from media server 230 and/or LAN access point 220. Additionally, or alternatively, media client 210 may tune to a channel on the electronic program guide and may receive a playlist from media server 230 and/or LAN access point 220. The playlist may include the set of local segment identifiers.

In some implementations, LAN access point 220 and media client 210 may communicate using an application programming interface (API). The application programming interface may be a Universal Plug and Play (UPnP) application programming interface, a representational state transfer (REST) application programming interface, or the like.

Additionally, or alternatively, LAN access point 220 may receive the set of local segment identifiers from media server 230. For example, LAN access point 220 may obtain a playlist from media server 230 (e.g., based on a request from media client 210). The playlist may include the set of local segment identifiers. In some implementations, the request from media client 210 may be routed to media server 230 via LAN access point 220, and LAN access point 220 may obtain the set of local segment identifiers during this routing. Additionally, or alternatively, LAN access point 220 may request the set of local segment identifiers from media server 230. Additionally, or alternatively, LAN access point 220 may store the set of local segment identifiers when LAN access point 220 stores the segments of media content and the local segment identifiers identify memory locations of LAN access point 220.

A local segment identifier may identify a segment of media content stored locally on LAN 240. For example, a local segment identifier may identify a location in the memory of LAN access point 220 and/or media server 230 (and not a memory location of content server 280).

As described above in connection with the first mapping information, the second mapping information may be used to map remote segment identifiers to corresponding local segment identifiers and/or to map remote keys to corresponding local keys. A remote segment identifier may correspond to (e.g., map to) a local segment identifier when the remote segment identifier and the local segment identifier are used to access the same segment of media content, but the segment of media content is stored in different locations.

As further shown in FIG. 4, process 400 may include storing redirect information that associates the first mapping information and the second mapping information (block 430). For example, LAN access point 220 may store redirect information in a data structure. The redirect information may be used to map the set of remote segment identifiers to the set of local segment identifiers using the first mapping information and the second mapping information. In some implementations, the redirect information may be used to map remote keys to local keys using the first mapping information and the second mapping information. For example, LAN access point 220 may store an association between a remote segment identifier and a corresponding local segment identifier. As another example, LAN access point 220 may store an association between a portion of the remote segment identifier and a portion of the corresponding local segment identifier. Additionally, or alternatively, LAN access point 220 may map key identifiers that identify locations where keys (e.g., security keys) are stored. The keys may be stored locally or remotely. In some implementations, a key may be used to encrypt segments of media content, to authenticate communications, or the like. In some implementations, a local key may be generated and/or stored by media server 230 and/or LAN access point 220, and a remote key may be generated and/or stored by key server 290.

As further shown in FIG. 4, process 400 may include receiving a request, associated with the media content, that includes a remote segment identifier (block 440), and determining a local segment identifier, that maps to the remote segment identifier, based on the redirect information (block 450). For example, LAN access point 220 may receive, from media client 210, a request associated with a segment of media content. The request may include a remote segment identifier. LAN access point 220 may use the redirect information to determine the local segment identifier based on the remote segment identifier and the redirect information.

In some implementations, LAN access point 220 may use an entire remote segment identifier to determine the entire local segment identifier. In some implementations, LAN access point 220 may replace a portion of a remote segment identifier with a portion of the local segment identifier. Additionally, or alternatively, LAN access point 220 may determine a local key identifier based on a remote key identifier and the redirect information. In this case, the remote key identifier may be included in the request for the segment of media content.

As further shown in FIG. 4, process 400 may include obtaining a segment of media content identified by the local segment identifier (block 460), and providing the segment of media content (block 470). For example, LAN access point 220 may obtain the segment of media content locally, such as via LAN 240. In some implementations, when LAN access point 220 stores segments of media content, LAN access point 220 may obtain the segment from memory of LAN access point 220. In this case, LAN access point 220 may transcode the segment of media content. As another example, when media server 230 stores segments of the media content, LAN access point 220 may request and receive the segment of media content from media server 230. In this case, media server 230 may transcode the segment of media content.

In some implementations, LAN access point 220 may provide the obtained segment to media client 210, and may cause media client 210 to output the segment of media content via an output component, such as a display, a speaker, or the like.

In this way, media client 210 may request media content using remote segment identifiers regardless of whether media client 210 is connected to LAN 240 or WAN 260. When media client 210 is connected to LAN 240, media client 210 may use a remote segment identifier to request media content, and LAN access point 220 may convert the remote segment identifier to a local segment identifier so that media client 210 can obtain the segment of media content via LAN 240. When media client 210 transitions to WAN 260, is connected to WAN 260, and/or is disconnected from LAN 240, media client 210 may also use the remote segment identifiers to access segment of media content via CDN 270.

Because media client 210 may not have to switch back and forth between using remote segment identifiers and local segment identifiers, the quality of service associated with playback of media content is improved. Additionally, by not switching between different types of segment identifiers, media client 210 may reduce a utilization of computing resources, such as a utilization of processing resources, a utilization of memory resources, or the like. Moreover, by not switching between different types of segment identifiers, media client 210 may conserve network resources by reducing requests for local segment identifiers when media client 210 is connected to WAN 260. Furthermore, media client 210 may reduce a likelihood of errors and/or requests for irretrievable content resulting from switching between different types of segment identifiers.

In some implementations, when transitioning between networks, such as LAN 240 and WAN 260, media client 210 may output segments of media content that have already been received rather than re-requesting the segments. In this way, media client 210 may conserve processing resources of media client 210 and the network resources of LAN 240, WAN 260, and/or CDN 270.

In some implementations, media client 210 may determine which network, such as LAN 240 or WAN 260, that media client 210 is connected to, and may use a corresponding set of segment identifiers to request media content. For example, media client 210 may use a set of local segment identifiers when connected to LAN 240, and may use a set of remote segment identifiers when connected to WAN 260. In this way, the quality of service associated with playback of media content may be increased. Moreover, network resources may be conserved by reducing requests for irretrievable content.

Additionally, or alternatively, media client 210 may use the set of remote segment identifiers if there is a failure in obtaining segments of media content using the set of local segment identifiers despite being connected to LAN 240. In this way, the quality of playback for media client 210 may be improved.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein permit a media client to utilize a remote segment identifier regardless of whether the media client is connected to a LAN or a WAN. In this way, the quality of service and playback of the media content on the media client may be improved, particularly when the media client transitions between networks. Also, the media client may conserve computing resources by reducing the processing associated with determining whether to use a remote segment identifier or a local segment identifier. Also, network resources may be conserved by reducing or eliminating requests for media content that use an incorrect segment identifier, such as a remote segment identifier on the LAN or a local segment identifier on the WAN.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive first mapping information associated with a set of remote segment identifiers that identify a set of remote locations, external from a local area network, from which a first set of segments of media content are accessible,
the first mapping information including a remote key identifier associated with the set of remote segment identifiers;
receive second mapping information associated with a set of local segment identifiers that identify a set of local locations, internal to the local area network, from which a second set of segments of the media content are accessible,
the second mapping information including a local key identifier associated with the set of local segment identifiers,
the second set of segments corresponding to the first set of segments;
map the set of remote segment identifiers to the set of local segment identifiers,
a remote segment identifier, of the set of remote segment identifiers, to map to a local segment identifier, of the set of local segment identifiers;
store redirect information that associates the first mapping information and the second mapping information based on mapping the set of remote segment identifiers to the set of local segment identifiers;
receive a request, associated with the media content, that includes the remote segment identifier of the set of remote segment identifiers;
determine the local segment identifier, of the set of local segment identifiers, based on the remote segment identifier and the redirect information,
the local segment identifier mapping to the remote segment identifier;
determine the local key identifier based on the remote key identifier and the redirect information;
request a segment of the media content using the local segment identifier;
request a local key using the local key identifier,
the local key to encrypt the segment of the media content and authenticate a communication; and
provide the segment of the media content to a media client.

2. The device of claim 1, where the set of remote segment identifiers are used to identify a first device external from the local area network; and
where the set of local segment identifiers are used to identify a second device internal to the local area network.

3. The device of claim 1, where the first mapping information includes a first set of uniform resource identifiers corresponding to the set of remote segment identifiers; and
where the second mapping information includes a second set of uniform resource identifiers corresponding to the set of local segment identifiers,
the second set of uniform resource identifiers being different from the first set of uniform resource identifiers.

4. The device of claim 1, where the first mapping information includes a first set of uniform resource identifier portions corresponding to the set of remote segment identifiers; and
where the second mapping information includes a second set of uniform resource identifier portions corresponding to the set of local segment identifiers,
the second set of uniform resource identifier portions being different from the first set of uniform resource identifier portions.

5. The device of claim 1, where
the remote key identifier identifies a remote location where a remote key is stored, and
where
the local key identifier identifies a local location where the local key is stored.

6. The device of claim 5, where the one or more processors are further to:
request the remote key using the remote key identifier.

7. The device of claim 1, where each remote segment identified, of the set of remote segment identifiers, identifies a remote location of the set of remote locations associated with a wide area network.

8. A non-transitory computer-readable medium storing instructions, the instructions comprising:
one or more instructions that, when executed by one or more processors, cause the one or more processors to:
receive a request, associated with media content, that includes a first segment identifier of a first set of segment identifiers that identify a set of remote locations, external from a local area network, from which a first set of segments of the media content are accessible,
the request including a remote key identifier associated with the first set of segment identifiers;
map the first segment identifier to a second segment identifier, of a second set of segment identifiers,
the second set of segment identifiers being associated with a local key identifier,
the first segment identifier, of the first set of segment identifiers, to map to the second segment identifier, of the second set of segment identifiers;
determine, based on mapping the first segment identifier to the second segment identifier and based on redirect information, the second segment identifier of the second set of segment identifiers that identify a set of local locations, internal to the local area network, from which a second set of segments of the media content are accessible,
the second set of segments corresponding to the first set of segments, and
the redirect information indicating that the second segment identifier corresponds to the first segment identifier;
determine the local key identifier based on the remote key identifier and the redirect information;
request a segment of the media content using the second segment identifier;
request a local key using the local key identifier,
the local key to encrypt of the segment of the media content and authenticate communication; and
provide the segment of the media content to a media client.

9. The non-transitory computer-readable medium of claim 8, where the first set of segment identifiers are used to identify one or more devices external from the local area network; and
where the second set of segment identifiers are used to identify one or more devices internal to the local area network.

10. The non-transitory computer-readable medium of claim 8, where the one or more instructions, when executed by the one or more processors, further cause the one or more processors to:
obtain, based on requesting the local key using the local key identifier, the local key; and
where the one or more instructions, that cause the one or more processors to request the segment of the media content, cause the one or more processors to:
request the segment of the media content using the local key identifier.

11. The non-transitory computer-readable medium of claim 8, where the one or more instructions, when executed by the one or more processors, cause the one or more processors to:
receive first mapping information associated with the first set of segment identifiers;
receive second mapping information associated with the second set of segment identifiers; and
store the redirect information based on the first mapping information and the second mapping information,
the redirect information being used to map the first set of segment identifiers and the second set of segment identifiers based on the first mapping information and the second mapping information.

12. The non-transitory computer-readable medium of claim 11, where the one or more instructions, that cause the one or more processors to receive the first mapping information, cause the one or more processors to:
receive the first mapping information from the media client.

13. The non-transitory computer-readable medium of claim 11, where the one or more instructions, that cause the one or more processors to receive the second mapping information, cause the one or more processors to:
receive the second mapping information from a device other than the media client.

14. A method, comprising:
receiving, by a device, first mapping information associated with a set of remote segment identifiers that identify a set of remote locations, external from a local area network to which the device is connected, from which a first set of segments of media content are accessible,
the first mapping information including a remote key identifier associated with the set of remote segment identifiers;
receiving, by the device, second mapping information associated with a set of local segment identifiers that identify a set of local locations, internal to the local area network, from which a second set of segments of the media content are accessible,
the second mapping information including a local key identifier associated with the set of local segment identifiers,
the second set of segments corresponding to the first set of segments;
mapping, by the device, the set of remote segment identifiers to the set of local segment identifiers,
a remote segment identifier, of the set of remote segment identifiers, to map to a local segment identifier, of the set of local segment identifiers;
storing, by the device, redirect information that associates the first mapping information and the second mapping information based on mapping the set of remote segment identifiers to the set of local segment identifiers;
receiving, by the device, a request, associated with the media content, that includes the remote segment identifier of the set of remote segment identifiers;
determining, by the device, the local segment identifier, of the set of local segment identifiers, based on mapping the set of remote segment identifiers to the set of local segment identifiers, the local segment identifier corresponding to the remote segment identifier;

determining, by the device, the local key identifier based on the remote key identifier and the redirect information;

requesting, by the device, a segment of the media content using the local segment identifier;

requesting, by the device, a local key using the local key identifier,
the local key to encrypt of the segment of the media content and authenticate communication; and providing, by the device, the segment of the media content to a media client.

15. The method of claim 14, where providing the segment of the media content comprises:
providing the segment of the media content to the media client via the local area network.

16. The method of claim 14, where the set of local segment identifiers identify the device.

17. The method of claim 14, where the set of local segment identifiers identify a media server, different from the device, connected to the local area network.

18. The method of claim 17, where receiving the second mapping information comprises:
receiving the second mapping information from the media server.

19. The method of claim 14, where the set of remote segment identifiers identify one or more content servers external from the local area network.

20. The method of claim 14, where receiving the first mapping information comprises:
receiving the first mapping information from the media client.

* * * * *